United States Patent
Chen et al.

(10) Patent No.: US 10,196,533 B2
(45) Date of Patent: Feb. 5, 2019

(54) HYDROPHILIC PIGMENT DISPERSANT FOR AN INKJET INK

(71) Applicant: Hewlett-Packard Development Company, L.P., Houston, TX (US)

(72) Inventors: Tienteh Chen, San Diego, CA (US); June Yang, Aguadilla, PR (US); Marcos A. Barreto, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/518,232

(22) PCT Filed: Oct. 31, 2014

(86) PCT No.: PCT/US2014/063355
§ 371 (c)(1),
(2) Date: Apr. 10, 2017

(87) PCT Pub. No.: WO2016/068985
PCT Pub. Date: May 6, 2016

(65) Prior Publication Data
US 2017/0247558 A1    Aug. 31, 2017

(51) Int. Cl.
| C09D 11/033 | (2014.01) |
| C09D 11/102 | (2014.01) |
| C09D 11/107 | (2014.01) |
| C09D 11/322 | (2014.01) |
| C09D 11/326 | (2014.01) |
| C09D 11/38 | (2014.01) |

(52) U.S. Cl.
CPC ............ *C09D 11/38* (2013.01); *C09D 11/033* (2013.01); *C09D 11/102* (2013.01); *C09D 11/107* (2013.01); *C09D 11/322* (2013.01); *C09D 11/326* (2013.01)

(58) Field of Classification Search
CPC ..... C09D 11/38; C09D 11/322; C09D 11/102; C09D 11/107; C09D 11/033; C09D 11/326
See application file for complete search history.

(56) References Cited

U.S. PATENT DOCUMENTS

| 6,136,890 A | 10/2000 | Carlson et al. |
| 6,294,606 B1 * | 9/2001 | Chen .................... G03G 9/0806 430/137.14 |
| 6,455,611 B1 | 9/2002 | Pears et al. |
| 6,908,185 B2 | 6/2005 | Chen et al. |
| 7,858,676 B2 | 12/2010 | Waki et al. |
| 8,348,411 B2 | 1/2013 | Brust et al. |
| 8,383,700 B2 | 2/2013 | Goto et al. |
| 8,492,456 B2 * | 7/2013 | Chen ..................... C09D 11/30 106/31.6 |
| 8,679,243 B2 | 3/2014 | Yokoyama et al. |
| 8,722,762 B2 | 5/2014 | Peleshanko |
| 2001/0025093 A1 * | 9/2001 | Ishizaki .................... C08J 3/12 526/210 |
| 2008/0207820 A1 | 8/2008 | Brust et al. |
| 2008/0233363 A1 | 9/2008 | Goto |
| 2009/0242847 A1 * | 10/2009 | Hosoya .................. G02F 1/167 252/500 |
| 2009/0322842 A1 | 12/2009 | Kosydar et al. |
| 2010/0055322 A1 | 3/2010 | Brust et al. |
| 2010/0166962 A1 | 7/2010 | Ohzeki |
| 2012/0050380 A1 | 3/2012 | Falkner et al. |
| 2012/0249661 A1 * | 10/2012 | Tyrell ..................... C09D 11/38 347/20 |
| 2013/0102729 A1 | 4/2013 | Li et al. |
| 2013/0144008 A1 | 6/2013 | Roberts et al. |
| 2013/0182032 A1 | 7/2013 | Roberts et al. |
| 2013/0237661 A1 | 9/2013 | Brust et al. |

FOREIGN PATENT DOCUMENTS

| CN | 103601867 | 2/2014 |
| WO | WO-2011063190 | 5/2011 |
| WO | WO-2012088122 | 6/2012 |
| WO | WO-2013067222 | 5/2013 |
| WO | WO-2013096344 | 6/2013 |
| WO | WO 2013/098652 | 7/2013 |
| WO | WO-2013165946 | 11/2013 |
| WO | WO-2016018306 | 2/2016 |

OTHER PUBLICATIONS

International Search Report and Written Opinion for International Application No. PCT/US2014/063355 dated Jun. 30, 2015, 13 pages.

* cited by examiner

*Primary Examiner* — Patrick D Niland
(74) *Attorney, Agent, or Firm* — Dierker & Kavanaugh PC

(57) ABSTRACT

A hydrophilic pigment dispersant for an inkjet ink includes water and a hydrophilic polyurethane having a weight average molecular weight from 3,000 to 15,000, and an acid number ranging from 50 to 100. The polyurethane is formed from 25 wt % to 70 wt % of a non-aromatic polyisocyanate; 0 wt % to 60 wt % of a polyol having a weight average molecular weight from 500 to 5,000; 0 wt % to 30 wt % of an aromatic diol having a weight average molecular weight ranging from 100 to 1000; 5 wt % to 25 wt % of an acid monomer having a hydroxyl functional group, an amino functional group, or both hydroxyl and amino functional groups; and 0 wt % to 5 wt % of a polyethyleneoxide compound having a hydroxyl functional group, an amino functional group, or both hydroxyl and amino functional groups; wherein at least one of the polyol or the aromatic diol is present.

11 Claims, 2 Drawing Sheets

$$M_V = \frac{\sum_1^n D_i^4}{\sum_1^n D_i^3}$$

HYDROPHILIC PIGMENT DISPERSANT FOR AN INKJET INK

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and drawings, in which.

DETAILED DESCRIPTION

Figures 1, 2:
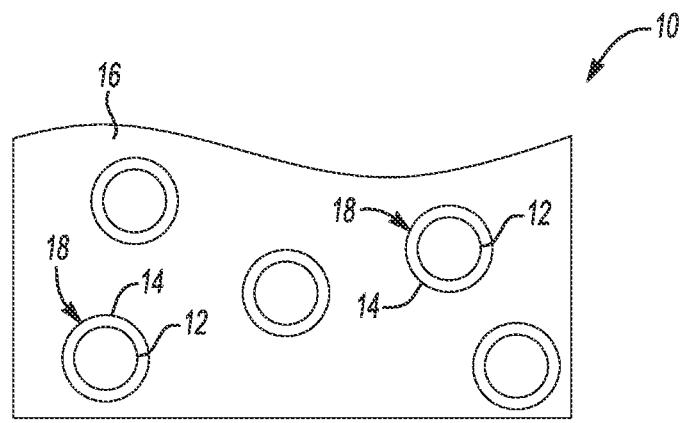
FIG. 1 is a schematic illustration showing an example of an ink composition according to the present disclosure.
FIG. 2 depicts an example equation for determining volume-weighted mean diameter (Mv)

Examples of the hydrophilic polyurethane pigment dispersant disclosed herein, when included in an inkjet ink, provide a stable ink with improved reliability (e.g., in terms of decap performance and kogation resistance), as well as durability (e.g., in terms of highlighter smear) of a resulting print, with respect to a comparable inkjet ink including a styrene acrylic resin dispersant instead of the example polyurethane dispersant.

The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to render the pen healthy at a specific time interval. A decreased decap time can lead to poor print reliability. As such, the longest decap time that would give acceptable first drop quality or the fewest number of spits required at any given decap time would be desirable for any given ink.

Examples of the inkjet ink disclosed herein, which include example(s) of the hydrophilic polyurethane dispersant disclosed herein, exhibit several desirable characteristics, one of which is improved decap performance. In particular, when the inkjet ink is printed at intervals with idle and uncapped periods between printing intervals, the number of spits (drops) required to obtain a healthy (i.e., drop weight and location) normal drop on a medium is reduced, and/or the number of missing nozzles during short term decap testing is reduced, e.g., when compared to inks including a styrene acrylic resin dispersant instead of the example polyurethane dispersant.

The improved decap performance is believed to be due, at least in part, to the relatively small size of the hydrophilic polyurethane dispersant. For example, the polyurethane dispersant may be in the form of particles having an average particle size ranging from about 10 nm to about 200 nm. These small particles can be easily jetted, and thus do not deleteriously affect the nozzle health. These properties may also contribute to the inkjet ink having dispersion stability, faster curing speed, and the ability to form durable prints. Overall, the inkjet inks including examples of the polyurethane dispersant disclosed herein exhibit improved jetting performance and print reliability.

Examples of the inkjet ink disclosed herein (which include an example of the hydrophilic polyurethane pigment dispersant disclosed herein), may be included in a single cartridge ink set or a multiple-cartridge ink set. In the multiple-cartridge ink set, any number of the multiple inks may have the polyurethane dispersant incorporated therein. As used herein, the terms "ink(s)" and "ink composition" refer to the water soluble, inkjet ink including an example of the hydrophilic polyurethane pigment dispersant disclosed herein.

Referring now to FIG. 1, in an example, the inkjet ink 10 disclosed herein includes a dispersion of a plurality of colorant pigment particles 12 (i.e., a colorant), a co-solvent, a non-ionic surfactant, an anti-kogation agent, a humectant, a chelating agent, the hydrophilic pigment dispersant 14, and a balance of water. In FIG. 1, the co-solvent, the non-ionic surfactant, the anti-kogation agent, the humectant, the chelating agent, and the water are shown as ink vehicle 16. In some examples, the inkjet ink composition 10 consists of these components, with no other components. As one example, the inkjet ink 10 may exclude polymers other than the hydrophilic polyurethane in the hydrophilic pigment dispersant 14 as disclosed herein.

In a further example, the ink vehicle 16 may also include a non-ionic fluorosurfactant, a water soluble acrylic acid polymer dispersant; a polyethylene wax emulsion, and an aqueous dispersion of polymer particles having a particle size ranging from about 185 nm to about 215 nm and having a polydispersity index (PDI) ranging from about 1.1 to about 1.2.

In an example, the aqueous dispersion of polymer particles is present in an amount ranging from about 4 wt % to about 7 wt % of a total wt % of the ink; or from about 2 wt % to about 10 wt % of a total wt % of the ink. The aqueous dispersion of polymer particles (referred to herein as HP 900MI Latex) may be made by emulsion polymerization of a reactive polymerizable surfactant (e.g., a polyoxyethylene alkylphenyl ether ammonium sulfate, commercially available under the tradename HITENOL, from Dai-ichi Kogyo Seiyaku Co., Ltd.) and the following monomers: styrene, methyl methacrylate, butyl acrylate and methacrylic acid. The aqueous dispersion of polymer particles has a number average molecular weight of about 89 KDa, and a weight average molecular weight of about 280 KDa. The aqueous dispersion of polymer particles does not act as a dispersant.

As used herein, "ink vehicle" may refer to the liquid fluid in which the hydrophilic dispersant and the dispersion of colorant pigment particles are placed to form the ink(s). A wide variety of ink vehicles may be used in the inkjet ink. The ink vehicle may include water alone or in combination with a mixture of a variety of additional components. Examples of these additional components may include the co-solvent(s), the surfactant(s), the anti-kogation agent(s), the chelating agents, the humectants, the aqueous dispersion of polymer particles, biocides, etc.

The co-solvent(s) may be present in the inkjet ink in an amount ranging from about 0.1 wt % to about 30 wt %, depending, at least in part, on the jetting architecture. In example inks, the co-solvent is present in the inkjet ink in an amount ranging from about 0.5 wt % to about 10 wt %, or from about 7 wt % to about 13 wt %, based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone, 2-pyrrolidone, triethylene glycol (3EG), or combinations thereof.

As mentioned above, the ink vehicle of the inkjet ink may also include surfactant(s). As an example, the inkjet ink may include non-ionic, cationic, and/or anionic surfactants, which may be present in an amount ranging from about 0.01 wt % to about 5 wt % based on the total wt % of the inkjet ink. In an example, the surfactant is a non-ionic surfactant, a non-ionic fluorosurfactant, or a combination thereof. In another example, the surfactant is a non-ionic surfactant present in an amount ranging from about 0.5 wt % to about 0.65 wt % of a total wt % of the ink. In yet another example, the surfactant is a combination of a non-ionic surfactant present in an amount ranging from about 0.5 wt % to about 1 wt % of a total wt % of the ink, and a non-ionic fluorosurfactant present in an amount ranging from about 0.4 wt % to about 0.65 wt % of a total wt % of the ink. In at least some examples, the ink vehicle may include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE® FS-35, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.).

As mentioned above, the ink vehicle of the inkjet ink may include an anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include phosphate-containing surfactants (e.g., oleth-3-phosphate, commercially available as CRODAFOS™ O3A or CRODAFOS™ N-3 acid from Croda Int.) or dextran 500 k. Other suitable examples of the anti-kogation agents include CRODAFOS™ HCE (Croda Int.), CRODAFOS™ N10 (Croda Int.), DISPERSOGEN® LFH (Clariant), etc. The anti-kogation agent may be present in the inkjet ink in an amount ranging from about 0.05 wt % to about 2 wt % of the total wt % of the ink. In further examples, the anti-kogation agent may be present in the inkjet ink in an amount ranging from about 0.1 wt % to about 0.2 wt % of the total wt % of the ink; or from about 0.2 wt % to about 0.75 wt % of a total wt % of the ink.

The ink vehicle may also include humectants/solubilizers. If included, the humectant is present in an amount ranging from about 2 wt % to about 12 wt %; or from about 4 wt % to about 8 wt %; or from about 3 wt % to about 9 wt % of a total wt % of the ink. It is to be understood that any suitable humectants may be used, some examples of which include di-(2-hydroxyethyl)-5,5-dimethylhydantoin (commercially available as DANTOCOL DHE from Lonza, Inc.), 2-methyl-1,3-propanediol (commercially available as MPDiol® from Lyondell Chemical Company), and/or the like.

In further examples of the ink composition, the ink vehicle may include chelating agents. If included, the chelating agent is present in an amount ranging from about 0.001 wt % to about 0.1 wt %; or from about 0.002 wt % to about 0.075 wt %; or from about 0.02 wt % to about 0.04 wt % of a total wt % of the ink. It is to be understood that any suitable chelating agents may be used, some examples of which include methylglycinediacetic acid, (commercially available as Trilon M from BASF Corporation), 1,3-propanediamine-N,N,N',N'-tetraacetic acid (commercially available as PDTA-H4 from TCI Chemicals), and/or the like.

In yet further examples of the ink composition, the ink vehicle may include a water soluble acrylic acid polymer dispersant. If included, the water soluble acrylic acid polymer dispersant is present in an amount ranging from about 0.001 wt % to about 0.01 wt %; or in an amount of about 0.0075 wt % of a total wt % of the ink. It is to be understood that any suitable acrylic acid polymer dispersant may be used, an example of which includes an acrylic acid polyelectrolyte (commercially available as Carbosperse K-7028 from Lubrizol). The acrylic acid polymer dispersant is added in the ink as a sequestering agent for divalent and multivalent cations. However, the acrylic acid polymer dispersant is not a copolymer containing hydrophobic moieties to interact with hydrophobic sites in an organic colorant dispersion. The acrylic acid polymer dispersant generally is not used to stabilize organic pigments.

The ink vehicle may also include a polyethylene wax emulsion. If included, the polyethylene wax emulsion is present in an amount ranging from about 0.1 wt % to about 1 wt %; or from about 0.4 wt % to about 0.8 wt % of a total wt % of the ink. It is to be understood that any suitable polyethylene wax emulsion may be used, an example of which includes an alkyd phenol ethoxylate (APE)-free large particle wax polyethylene emulsion (commercially available as Liquilube 405 from Lubrizol).

In some examples disclosed herein, the ink vehicle of the inkjet ink may also include antimicrobial agent(s) (biocides), viscosity modifier(s), material(s)/buffering agents for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the ink. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL™ GXL (Arch Chemicals, Inc., Norwalk, Conn.) is 0.2 wt %. Suitable biocides include, for example, PROXEL™ GXL, KORDEK™ MLX (The Dow Chemical Co.), and/or BIOBAN™ CS-1246 (The Dow Chemical Co.).

The inkjet ink may be any color, such as black, cyan, magenta, yellow, red, orange, etc. As such, in addition to the ink vehicle, the inkjet ink also includes a colorant. In an example, the colorant is a dispersion of a plurality of colorant pigment particles (i.e., color concentrate dispersion) added to the ink vehicle. The colorant dispersion/color concentrate dispersion includes water. In an example, the colorant dispersion may also include a co-solvent (such as, e.g., 2-pyrrolidone). In examples of the colorant dispersion, the pigment particles may be present in an amount ranging from about 8 wt % to about 20 wt %, based upon a total weight percent of the colorant dispersion/color concentrate dispersion. In a further example, the pigment particles are present at about 15 wt %, based upon a total weight percent of the colorant dispersion/color concentrate dispersion.

In an example of the ink composition, the colorant pigment particle dispersion/color concentrate dispersion is present in an amount ranging from about 1 wt % to about 5 wt % (based on the total wt % of the inkjet ink. In further examples, the colorant pigment particle dispersion/color concentrate dispersion is present in an amount ranging from about 2.5 wt % to about 5 wt % of a total wt % of the ink; or from about 2.6 wt % to about 4 wt % of a total wt % of the ink. Some further example pigment loadings (based on a total weight percent of the ink) in various respective example inks include: 4 wt % yellow colorant pigment particle dispersion; 3.5 wt % magenta colorant pigment particle dispersion; 2.5 wt % cyan colorant pigment particle dispersion; 2.75 wt % black colorant pigment particle dispersion; and 4 wt % orange colorant pigment particle dispersion. The average particle size of the pigments may range anywhere from about 80 nm to about 150 nm.

The colorant dispersion may be prepared or purchased, and the other components of the ink (e.g., vehicle components and the hydrophilic pigment dispersant) may be slowly added to the pigment dispersion with continuous mixing, to form the inkjet ink.

It has been unexpectedly and fortuitously discovered that the polarity of a pigment is an indicator of whether an ink composition with a colorant dispersion (including the pigment) will show improvement when the ink contains an example of the hydrophilic pigment dispersant disclosed herein (as opposed to instead containing a styrene acrylic resin dispersant). The polarity is a parameter that may be obtained through pigment surface energy measurement, and indicates how hydrophilic the pigment is. Example ink compositions that performed better (including example hydrophilic pigment dispersants) than comparative ink compositions (including styrene acrylic resin dispersants) included pigments that had a higher polarity. Higher polarity, as used herein, is generally equal to or higher than about 0.4, up to about 0.7. Ink compositions (with an example hydrophilic pigment dispersant) that included pigments which have a polarity lower than 0.2 performed similarly to ink compositions including styrene acrylic resin dispersants.

Some examples of pigments with suitable polarities for use in the ink compositions disclosed herein are as follows: Pigment Yellow 180: 0.47; Irgazin DPP Red BTR (Pigment Red 254): 0.43; and Orange DPP TR (Pigment Orange 71): 0.39.

Irgazin® Red L 3630 (formerly Irgazin® DPP Red BTR) is a diketo-pyrrolo-pyrrole (DPP) pigment. Irgazin® Red L 3630 is a very transparent and saturated diketo-pyrrolo-pyrrole. Orange DPP TR is also a diketo-pyrrolo-pyrrole.

An example of the surface energy measurement used is modified according to ASTM D7490-08. The pigment is first pressed into a pellet with a flat surface. Then contact angles of drops of deionized (DI) water and diiodomethane are measured on the surface of the pigment pellet. The two values are then substituted into two separate expressions of the Owens-Wendt-Kaelble equation (one for each liquid). This results in two equations with two unknowns, which are then solved for the dispersion and polar components of surface tension. The sum of the dispersion component and the polar component is the surface energy of the pigment. The polarity is the ratio of polar component (dynes/cm) to surface energy (dynes/cm). As such, polarity is a unit-less factor.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a red pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 254, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 66, and C.I. Pigment Orange 71.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, the BLACK PEARLS® series, or the MONARCH® series manufactured by Cabot Corporation, Boston, Mass., (such as, e.g., REGAL® 400R, REGAL® 330R, REGAL® 660R, MOGUL® E, MOGUL® L, BLACK PEARLS® 700, BLACK PEARLS® 800, BLACK PEARLS® 880, MONARCH® 1100, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® 75, PRINTEX® 80, PRINTEX® 85, PRINTEX® 95, PRINTEX® U, PRINTEX® V, PRINTEX® XE2, PRINTEX® 140U, Special Black 5, Special Black 4A, and Special Black 4). Further examples of carbon black pigments include NIPex® 70, NIPex® 180-IQ, Hiblack® 600L, and Hiblack® 900L manufactured by Orion Engineered Carbons LLC, Kingwood, Tex. An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The inkjet ink also includes the hydrophilic pigment dispersant including the hydrophilic polyurethane. In an example, the hydrophilic polyurethane is present in the hydrophilic pigment dispersant with water. The hydrophilic polyurethane is present in the ink in an amount ranging from about 1.5 wt % active to about 2.0 wt % active; or from about 0.4 wt % active to about 2.1 wt % active in the inkjet ink. This weight percentage accounts for the weight percent of active hydrophilic polyurethane material present in the ink composition, and does not account for the total weight percent of the hydrophilic inkjet pigment dispersant in the inkjet ink. The hydrophilic inkjet pigment dispersant may be added with the colorant (e.g., colorant pigment particle dispersion) and the components of the ink vehicle to form the inkjet ink.

An example of the hydrophilic pigment dispersant for an inkjet ink as disclosed herein includes water and a hydrophilic polyurethane (PU). In an example, the hydrophilic polyurethane has a weight average molecular weight ranging from about 3,000 to about 15,000, and has an acid number ranging from about 50 to about 100.

The hydrophilic polyurethane is formed from the following components:

a) a non-aromatic polyisocyanate present in an amount ranging from about 25 wt % to about 70 wt %; or from about 50 wt % to about 66 wt %; or from about 35 wt % to about 44 wt %;

b) a polyol having a weight average molecular weight ranging from about 500 to about 5,000, the polyol being present in an amount ranging from about 0 wt % to about 60 wt %; or from about 0 wt % to about 8 wt %; from about 7 wt % to about 8 wt %; or from about 42 wt % to about 52 wt %;

c) an aromatic diol having a weight average molecular weight ranging from about 100 to about 1000, the aromatic diol being present in an amount ranging from about 0 wt % to about 30 wt %; or from about 9 wt % to about 24 wt %; or from about 18 wt % to about 19 wt %;

d) an acid monomer having a hydroxyl functional group, an amino functional group, or both hydroxyl and amino functional groups, the acid monomer being present in an amount ranging from about 5 wt % to about 25 wt %; or from about 19 wt % to about 24 wt %; or from about 13 wt % to about 18 wt %; and e) a polyethyleneoxide compound having a hydroxyl functional group, an amino functional group, or both hydroxyl and amino functional groups, the polyethyleneoxide compound being present in an amount ranging from about 0 wt % to about 5 wt %; or from about 0.9 wt % to about 1.2 wt %.

The weight percents are based on a total amount of the hydrophilic polyurethane in the inkjet pigment dispersant. It is to be understood that at least one of the polyol or the aromatic diol is present (in other words, both components b) and c) may not be at 0 wt %).

In an example, the non-aromatic polyisocyanate is an aliphatic or cycloaliphatic polyisocyanate selected from the group consisting of hexamethylene-1,6-diisocyanate (HDI); 1,12-dodecane diisocyanate (C12DI); 2,2,4-trimethyl-hexamethylene diisocyanate (TMDI); 2,4,4-trimethyl-hexamethylene diisocyanate (TMDI); 2-methyl-1,5-pentamethylene diisocyanate; isophorone diisocyanate (IPDI); and 4,4'-diisocyanato dicyclohexylmethane (H12MDI). It is to be understood that, in another example, combinations of these non-aromatic polyisocyanates may also be used.

The term "polyol", as used herein, means any product having an average of about two or more hydroxyl groups per molecule. The polyol may be selected from the group consisting of polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters, and halogenated polyethers. It is to be understood that, in another example, combinations of these polyols may also be used.

The aromatic diol may be selected from the group consisting of Bisphenol A, Bisphenol A ethoxylate (BPAE), Bisphenol A (2,3-dihydroxypropyl) glycidyl ether, Bisphenol A bis(3-chloro-2-hydroxypropyl) ether, Bisphenol A bis(2,3-dihydroxypropyl) ether, Bisphenol A glycerolate (1 glycerol/phenol) diacrylate, Bisphenol A propoxylate, 4,4'-(1-phenylethylidene)bisphenol, 4,4'-sulfonyldiphenol, 4,4'-dihydroxybiphenyl, 2,2'-biphenol, 4,4'-thiodiphenol, Bis[4-(2-hydroxyethoxy)phenyl] sulfone, and 4,4'-sulfonylbis(2-methylphenol). It is to be understood that, in another example, combinations of these aromatic diols may also be used.

The acid monomer may be selected from the group consisting of dimethylolpropionic acid (DMPA), dimethylol butanoic acid (DMBA), citric acid, tartaric acid, glycolic acid, lactic acid, malic acid, dihydroxymaleic acid, dihydroxytartaric acid, alanine, taurine, aminoethylaminopropylsulfonate (EPS), and glycerol phosphate disodium dehydrate. It is to be understood that, in another example, combinations of these acid monomers may also be used.

The polyethyleneoxide compound may be selected from the group consisting of polyetheramines, methoxy polyethylene glycol, and polyethyleneoxide diol. It is to be understood that, in another example, combinations of these polyethyleneoxide compounds may also be used. In an example, the polyethyleneoxide compound also has a water solubility of >10% w/w, and the OH functionality ranges from at least 1.8 to 3, or in some examples from 1.9 to 2.2. The number average molecular weight ranges from about 500 to 2,000. Some examples of the polyethyleneoxide compound include YMER™ N-120 (Perstop Chemical Company), Jeffamine M-700 and M-2070 (commercially available from Huntsman Chemical), and methoxy polyethylene glycol (Mn=550, 750, 2000, 5000) (commercially available from Aldrich Chemical).

It is to be understood that the hydrophilic polyurethane may be partially or fully soluble in the water; or the hydrophilic polyurethane may be dispersed in the water. In an example, the dispersed hydrophilic polyurethane has an average particle size ranging from about 10 nm to about 200 nm.

It has been found that the ratio of the pigment loading of the plurality of colorant pigment particles (in the color concentrate dispersion) to the weight percent active of the hydrophilic polyurethane (PU) in the hydrophilic inkjet pigment dispersant (the weight percent active in the dispersant itself, not with respect to the final ink formulation) is one indicator of whether the pigment particles will be dispersed into a stable dispersion. In an example, this pigment:dispersant (P/D) ratio ranges from about 2.0 to about 10. In another example, this pigment:dispersant (P/D) ratio ranges from about 2.0 to about 2.6.

The P/D ratio for the comparative ink formulations herein is the ratio of the pigment loading of the plurality of colorant pigment particles (in the color concentrate dispersion) to the weight percent active of the styrene acrylic resin (SAR) in the comparative dispersant (the weight percent active in the comparative dispersant itself, not with respect to the final ink formulation).

Referring again to FIG. 1, in the examples disclosed herein, the hydrophilic pigment dispersant 14 including the hydrophilic polyurethane surrounds the plurality of colorant pigment particles 12 to form a plurality of dispersant-stabilized pigment particles 18. This stabilization of the pigment occurs through physical adsorption via either hydrophobic interaction or H-bonding. It is believed that the stabilization occurs through the aromatic moieties incorporated in the polymer backbone. In addition, the urethane linkage may provide H-bond interactions with electronegative atoms (e.g., oxygen) from the pigment structure. It is further believed that H-bonding is helpful for certain pigments, for which the hydrophobic interaction is not enough for stabilization. On the other hand, styrene acrylic resin dispersants (e.g., the Joncryl series of dispersants, examples of which include Joncryl® HPD 671, 678, 683 and 690, commercially available from BASF Corporation) do not provide H-bonding interaction.

Generally, once dispersed, the ink particles have a tendency to re-agglomerate. This process is called flocculation. From a structural standpoint, the flocculates are similar to the agglomerates; however, the interstitial spaces between the pigment particles are now filled with resin solution rather than air. Flocculation may, in some instances, destabilize the ink composition and clog the inkjet printhead. Examples of the dispersant-stabilized pigment particles disclosed herein may reduce the rate at which flocculation occurs, thereby improving the ink stability of the inkjet ink composition.

One method for determining stability of an ink composition is to measure the volume-weighted distribution of the dispersant-stabilized pigment particles 18. Such a distribution represents the population of particles, seen by their volume. As an example, the volume-weighted mean diameter may be measured with a NANOTRAC® 150 particle sizing system (using a 50% cumulative value of a volume-weighted mean diameter), commercially available from Microtrac, Inc. The particle sizing system uses dynamic scattering of laser light.

The volume-weighted mean diameters of the dispersant-stabilized pigment particles were measured after formation of the example ink compositions, and then re-measured after a predetermined amount of time at predetermined conditions. The volume-weighted mean diameters of comparative styrene acrylic resin-dispersed pigment particles were measured after formation of the comparative ink compositions, and then re-measured after the predetermined amount of time at the predetermined conditions. These results are shown below in Tables 5-7. The test samples for the NANO-TRAC® 150 are prepared by diluting ink samples [1:5000] with deionized water and analyzing the samples without further treatment. If a concentrated dispersion is tested, the samples are diluted 1:10,000 times with deionized water and analyzed without further treatment.

The volume-weighted mean diameter measurement is the mean diameter of the dispersant-stabilized pigment particles within a specific volume. The volume-weighted mean diameter is sometimes called the de Brouckere mean diameter, and is the weighted average volume diameter, assuming spherical particles of the same volume as the actual particles. FIG. 2 shows an example of a mathematical definition of volume-weighted mean diameter (Mv).

As an example, consider a representative sample taken from a large volume that only has 3 particles with diameters 1, 2, and 3. Applying the equation of FIG. 2, the volume-weighted mean diameter is $(1^4+2^4+3^4)/(1^3+2^3+3^3)=98/36=2.72$. As seen in the example, the volume-weighted mean diameter is sensitive to the presence of larger particles. In other words, in the 3 particle example above, the volume-weighted mean diameter (2.72) is closest to the largest diameter of 3. As such, if a large amount of flocculation occurs in the ink composition, the volume-weighted mean diameter of the dispersant-stabilized pigment particles may increase over time when compared to the original measurement made after formulation of the ink composition. Without being bound to any theory, it is believed that ink particles exhibiting a small increase, no increase, or a decrease in volume-weighted mean diameter after accelerated storage conditions (discussed below with regard to Tables 5-7) indicates that there is little or an acceptable amount of flocculation of the dispersant-stabilized pigment particles during storage. This is an indication that the ink composition remains stable.

If after storage, the volume-weighted mean diameter remains relatively constant, this is an indication of a stable dispersion. However, if the volume-weighted mean diameter increases significantly after an ink composition has been in storage, this may be a sign of undesirable flocculation and an indication of a less stable dispersion.

Examples of the dispersant-stabilized pigment particle(s) disclosed herein exhibit an improved stability after being stored in an accelerated storage environment when compared to styrene acrylic resin-dispersed pigment particle(s) subjected to the same accelerated storage environment. The accelerated storage environment may be an environment that has a temperature ranging from about 45° C. to about 60° C. In an example, the accelerated storage environment is at a temperature of about 60° C.

In an example, the dispersant-stabilized pigment particle(s) exhibited a change in volume-weighted mean diameter that ranged from about −15% to about +2% after storage of the ink composition for two weeks at about 60° C. when compared with the volume-weighted mean diameter of the dispersant-stabilized pigment particle(s) at ambient conditions after formation of the ink composition.

In another example, the dispersant-stabilized pigment particle(s) exhibited a change in volume-weighted mean diameter that ranged from about −10% to about −4% after storage of the ink composition for two weeks at about 60° C. when compared with the volume-weighted mean diameter of the dispersant-stabilized pigment particle(s) at ambient conditions after formation of the ink composition.

As used herein, ambient conditions are defined as a temperature of 298.15 K (25° C., 77° F.) and an absolute pressure of 100 kPa (14.504 psi, 0.987 atm).

In the examples disclosed herein, the inks may be tested at ambient conditions any time within about one day (or longer) of the inks being made. For example, the inks may be tested at ambient conditions immediately after ink formulation, or at any time thereafter. In an example, the inks may be tested at ambient conditions at a time falling within a range of from about 3 hours up to about 24 hours after the ink is made.

To further illustrate the present disclosure, examples are given herein. It is to be understood that these examples are provided for illustrative purposes and are not to be construed as limiting the scope of the present disclosure.

EXAMPLES

Example 1

Several examples of the hydrophilic pigment dispersant for an inkjet ink as disclosed herein were prepared. The compositions are shown in Table 1, with the respective wt % of each component. The acid number of each resulting dispersant is also provided in Table 1.

The following abbreviations are used herein and in Table 1: IPDI (isophorone diisocyanate), PTMG (polytetrahydrofuran polyol), Mw (weight average molecular weight)=1000), Kuraray C-1090 (polycarbonate polyol from Kuraray Chemical, Mw=1000), BPAE (Bisphenol A ethoxylate, Mw=492), DMPA (2,2'-Dimethylol Propionic Acid), N-120 (YMER N-120, polyethyleneoxide diol from Perstop Chemical), and AN (acid number).

TABLE 1

| Dispersant ID | Component (a) Type | Wt % | Component (b) Type | Wt % | Component (c) Type | Wt % | Component (d) Type | Wt % | Component (e) Type | Wt % | AN |
|---|---|---|---|---|---|---|---|---|---|---|---|
| PUD-1 | IPDI | 35.2 | PTMG | 51.5 | | | DMPA | 13.3 | | | 55.6 |
| PUD-12 | IPDI | 43.6 | C-1090 | 43.2 | | | DMPA | 13.2 | | | 55.1 |
| PUD-15 | IPDI | 39.8 | PTMG | 42.9 | | | DMPA | 17.3 | | | 72.3 |
| PUD-49 | IPDI | 65.7 | | | BPAE | 9.3 | DMPA | 23.8 | N-120 | 1.18 | 99.5 |
| PUD-50 | IPDI | 53.2 | PTMG | 7.66 | BPAE | 18.8 | DMPA | 19.3 | N-120 | 0.96 | 80.6 |
| PUD-51 | IPDI | 51.9 | | | BPAE | 23.2 | DMPA | 24 | N-120 | 0.94 | 100.4 |

PUD-50 was synthesized as follows:

15.3 g of PTMG, 38.5 g of DMPA, 1.92 g of Ymer N-120, 37.7 g of BPAE, 106.5 g of IPDI, and 86 ml of acetone were mixed in a 500 ml 4-neck round bottom flask. A mechanical stirrer with a glass rod and Teflon blade were attached. A condenser was attached, and the system was kept under a dry nitrogen blanket. The flask was immersed in a constant temperature bath at 70° C. 6 drops of dibutyl dilaurate (DBTDL) were added to initiate the polymerization. Polymerization was continued for 4 hours at 70° C.

16.3 g of methanol was added, with stirring for 30 minutes. The polymer solution was cooled to room temperature and slowly poured into an aqueous solution of 32.2 g of potassium hydroxide (45% solid) and 600 g of deionized water. Stirring was continued for one hour. A translucent solution was obtained.

Acetone was removed with a rotary evaporator. The solution was filtered through fiberglass filter paper. % solid was 27.5%. Particle size, measured by a Malvern Zetasizer, was 20 nm.

Each of the other example hydrophilic polyurethanes was prepared in a similar manner to PUD-50, using the components and amounts set forth in Table 1.

Dispersants PUD-1, PUD-12, and PUD-15 were tested to determine specific properties, as shown in Table 2. The following abbreviations are used in Table 2: $M_n$ (number average molecular weight in kg/mol), $M_w$ (weight average molecular weight in kg/mol), PDI (polydispersity index, which is the $M_w/M_n$), and % NV (% non-volatile solids).

TABLE 2

| Dispersant ID | $M_n$ | $M_w$ | PDI | % NV |
|---|---|---|---|---|
| PUD-1 | 7.2 | 29 | 4.0 | 22 |
| PUD-12 | 4.7 | 22 | 4.7 | 20 |
| PUD-15 | 4.2 | 18 | 4.3 | 29 |

Example 2

Example ink compositions were prepared with different pigments (yellow, red, and orange) and using examples of the hydrophilic pigment dispersants listed in Table 1. The formulation of example ink compositions (in Vehicle A) are shown in Table 3; and the formulation of an example ink composition (in Vehicle B) is shown in Table 4. The weight percents are with respect to a total weight percent of the ink composition.

TABLE 3

Yellow or Orange Ink composition in Vehicle A

| Pigment | PY-180 or PO-71 | 4.00 wt % (PY-180) or 4.00 wt % (PO-71) |
|---|---|---|
| Co-solvent | 1-(2-hydroxyethyl)-2-pyrrolidone | 1.50 wt % |
| Humectant | DANTOCOL ® DHE | 8.00 wt % |
| Chelating agent | PDTA-H4 | 0.075 wt % |
| Non-ionic surfactant | SURFYNOL ® SE-F | 0.65 wt % |
| Biocide | PROXEL ® GXL | 0.18 wt % |
| Biocide | KORDEK ® MLX | 0.14 wt % |
| Phosphate-containing surfactant (anti-kogation agent) | CRODAFOS ® N3 acid | 0.75 wt % |

TABLE 3-continued

Yellow or Orange Ink composition in Vehicle A

| Inkjet pigment dispersant | PUD-1 or PUD-12 or PUD-15 | 1.5 wt % active (PUD-1) 2 wt % active (PUD-12 or PUD-15) |
|---|---|---|
| Deionized Water | | Balance |

The yellow pigment (PY-180) and orange pigment (PO-71) have the following structures:

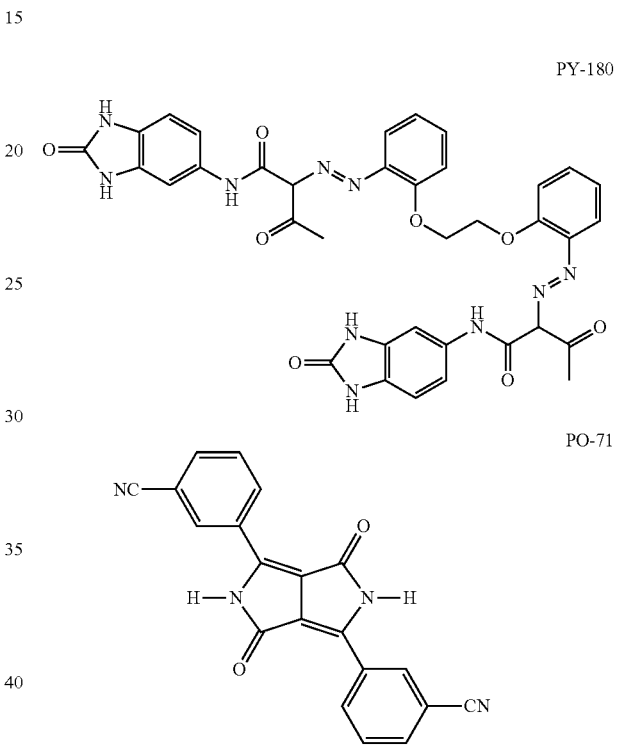

TABLE 4

Red Ink composition in Vehicle B

| Pigment | PR-254 | 2.6 wt % |
|---|---|---|
| Co-solvent | 2-pyrrolidone | 13.00 wt % |
| Humectant | MPDiol ® | 9.00 wt % |
| Chelating agent | TRILON ® M | 0.075 wt % |
| Non-ionic surfactant | TERGITOL ® 15-S-7 | 0.50 wt % |
| Non-ionic surfactant | TERGITOL ® TMN-6 | 0.90 wt % |
| Non-ionic fluorosurfactant | CAPSTONE ® FS-35 | 0.65 wt % |
| Phosphate-containing surfactant/anti-kogation agent | CRODAFOS ® O3A-LQ-(MH) | 0.20 wt % |
| Aqueous dispersion of polymer particles | HP 900MI Latex | 7.00 wt % |
| Water soluble acrylic acid polymer dispersant | CARBOSPERSE ® K7028 | 0.0075 wt % |
| Polyethylene wax emulsion | LIQUILUBE ® 405 | 0.80 wt % |
| Inkjet pigment dispersant | PUD-1 or PUD-12 or PUD-15 | 1.5 wt % active (PUD-1); 2 wt % active (PUD-12 or PUD-15) |
| Deionized Water | | Balance |

The red pigment (PR-254) has the following structure:

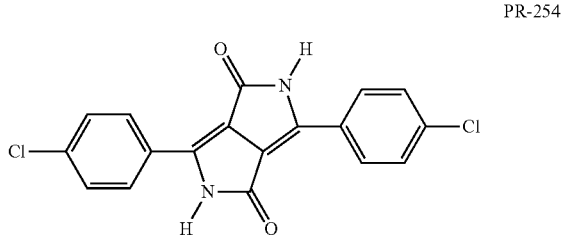 [SMILES: O=C1NC(c2ccc(Cl)cc2)=C2C(=O)NC(c3ccc(Cl)cc3)=C12]

PR-254

Comparative inks were also prepared according to Tables 3 and 4, but substituting 1.2 wt % active (for the yellow ink) or from 0.26-0.86 wt % active (for the red ink) of a styrene acrylic resin dispersant in place of the PUD-1, PUD-12 or PUD-15 inkjet pigment dispersants. The styrene acrylic resin dispersants used were Joncryl® HPD 671, 678, 683 and 690 dispersants. Some typical physical characteristics of Joncryl® 671 are as follows: weight average molecular weight is 17,000; acid value (on solids) is 214; density at 25° C. is 1.14 g/cm$^3$; and the glass transition temperature $T_g$ (DSC) is 120° C.

After each ink composition and comparative ink composition was prepared, the volume-weighted distribution of the dispersant-stabilized pigment particles and the Joncryl®-dispersed pigment particles was measured (at ambient conditions, and a time between about 3 hours after ink formation to about 24 hours after ink formation). This distribution (including the volume-weighted mean diameter, Mv) was determined using a NANOTRAC® 150 particle sizing system (as discussed above); the test ink samples were diluted (1:5000) with deionized water. The inks and comparative inks were then placed in accelerated storage conditions, i.e., oven baked at a temperature of 60° C. for two weeks. After two weeks, the volume-weighted distribution (including the volume-weighted mean diameter, Mv) was determined again for each ink composition and comparative ink composition. The results are shown below in Table 5, Table 6, and Table 7.

TABLE 5

Sample and Comparative Yellow Ink compositions in Vehicle A

| Pigment | P/D ratio | Pigment wt % in color concentrate dispersion | Dispersant | Total wt % of Dispersant w.r.t. total ink wt % | wt % actives of SAR or PU (in dispersion) | wt % actives of SAR or PU (in ink) | $M_v$ (μm) at ambient | $M_v$ (μm) after 2 wks @60 C. | % change in $M_v$ |
|---|---|---|---|---|---|---|---|---|---|
| *PY-180 | 3.3 | 15 | J683 | 12 | 4.5 | 1.2 | 0.135 | 0.439 | +225% |
| *PY-180 | 3.3 | 15 | J671 | 12 | 4.5 | 1.2 | 0.192 | 0.603 | +214% |
| *PY-180 | 3.3 | 15 | J678 | 12 | 4.5 | 1.2 | 0.289 | 0.601 | +108% |
| *PY-180 | 3.3 | 15 | J690 | 12 | 4.5 | 1.2 | 0.260 | 0.518 | +99.2% |
| PY-180 | 2.6 | 15 | PUD-1 | 7.76 | 5.8 | 1.5 | 0.168 | 0.170 | +1.19% |
| PY-180 | 2.0 | 15 | PUD-12 | 10.11 | 7.5 | 2 | 0.143 | 0.143 | 0% |
| PY-180 | 2.0 | 15 | PUD-15 | 10.42 | 7.5 | 2 | 0.156 | 0.152 | −2.63% |

(SAR = styrene acrylic resin; PU = hydrophilic polyurethane)
*Comparative ink composition

TABLE 6

Sample and Comparative Red Ink compositions in Vehicle B

| Pigment | P/D ratio | Dispersant | Total wt % of Dispersant w.r.t. total ink wt % | wt % actives of SAR or PU (in ink) | $M_v$ (μm) at ambient | $M_v$ (μm) after 2 wks @60 C. | % change in $M_v$ |
|---|---|---|---|---|---|---|---|
| *PR-254 | 3 | J671 | 8.6 | 0.86 | 0.238 | 0.693 | +191% |
| *PR-254 | 10 | J671 | 2.6 | 0.26 | 0.255 | 0.324 | +27% |
| *PR-254 | 3 | J671 | 8.6 | 0.86 | 0.242 | 0.422 | +74% |
| *PR-254 | 4.6 | J671 | 5.6 | 0.56 | 0.232 | 0.522 | +125% |
| *PR-254 | 10 | J671 | 2.6 | 0.26 | 0.252 | 0.283 | +12% |
| *PR-254 | 3 | J671 | 8.6 | 0.86 | 0.260 | 0.313 | +20% |
| *PR-254 | 4.6 | J671 | 5.6 | 0.56 | 0.244 | 0.305 | +25% |
| PR-254 | 2.6 | PUD-1 | 5.1 | 1.02 | 0.248 | 0.227 | −9.02% |
| PR-254 | 2.0 | PUD-12 | 6.5 | 1.30 | 0.243 | 0.232 | −4.74% |
| PR-254 | 2.0 | PUD-15 | 6.7 | 1.34 | 0.251 | 0.232 | −8.19% |

(SAR = styrene acrylic resin; PU = hydrophilic polyurethane)
*Comparative ink composition

TABLE 7

Sample and Comparative Orange Ink compositions in Vehicle A

| Pigment | P/D ratio | Dispersant | Total wt % of Dispersant w.r.t. total ink wt % | wt % actives of SAR or PU (in ink) | $M_v$ (µm) at ambient | $M_v$ (µm) after 2 wks @ 60 C. | % change in $M_v$ |
|---|---|---|---|---|---|---|---|
| *PO-71 | 10 | J671 | 4 | 0.4 | 0.172 | 0.364 | +112% |
| *PO-71 | 3 | J671 | 13.3 | 1.3 | 0.219 | 0.402 | +83.6% |
| *PO-71 | 4.6 | J671 | 8.7 | 0.9 | 0.226 | 0.391 | +73% |
| *PO-71 | 10 | J671 | 4 | 0.4 | 0.245 | 0.473 | +93% |
| *PO-71 | 3 | J671 | 13.3 | 1.3 | 0.203 | 0.536 | +164% |
| *PO-71 | 4.6 | J671 | 8.7 | 0.9 | 0.237 | 0.444 | +87% |
| PO-71 | 2.6 | PUD-1 | 7.76 | 1.6 | 0.201 | 0.179 | −12.3% |
| PO-71 | 2.0 | PUD-12 | 10.11 | 2.0 | 0.163 | 0.149 | −9.39% |
| PO-71 | 2.0 | PUD-15 | 10.42 | 2.1 | 0.200 | 0.189 | −5.82% |

(SAR = styrene acrylic resin; PU = hydrophilic polyurethane)
*Comparative ink composition As can be seen in Tables 5-7 above, the ink compositions containing one of the PUD-1, PUD-12 or PUD-15 dispersants as disclosed herein had a pigment:dispersant (P/D) ratio (as defined further above) of 2.6 or 2.0. Further, the dispersant-stabilized pigment particles 18 in these ink compositions exhibited a small increase, no increase, or a decrease in volume-weighted mean diameter (Mv) after accelerated storage conditions. The comparative ink compositions exhibited a significant increase in volume-weighted mean diameter (Mv). This indicates that there is little or an acceptable amount of flocculation of the dispersant-stabilized pigment particles during storage. This is an indication that the ink composition remains stable.

Example 3

TABLE 8

Magenta Ink composition in Vehicle A

| Pigment | PR-122 | 3.5 wt % |
|---|---|---|
| Co-solvent | 1-(2-hydroxyethyl)-2-pyrrolidone | 1.50 wt % |
| Humectant | DANTOCOL ® DHE | 8.00 wt % |
| Chelating agent | PDTA-H4 | 0.075 wt % |
| Non-ionic surfactant | SURFYNOL ® SE-F | 0.65 wt % |
| Biocide | PROXEL ® GXL | 0.18 wt % |
| Biocide | KORDEK ® MLX | 0.14 wt % |
| Phosphate-containing surfactant (anti-kogation agent) | CRODAFOS ® N3 acid | 0.75 wt % |
| Inkjet pigment dispersant | PUD-12 | 1.7 wt % active |
| Deionized Water | | Balance |

An Example magenta ink composition was prepared using a PUD-12 hydrophilic pigment dispersant (from Table 1). The formulation of the example magenta ink composition (in Vehicle A) is shown in Table 8. A comparative magenta ink was also prepared according to Table 8, but substituting 0.64 wt % active of styrene acrylic resin (from a styrene acrylic resin dispersant, Joncryl® HPD 671), in place of the PUD-12 inkjet pigment dispersant.

The magenta pigment (Pigment Red 122 Quinacridone) has the following structure:

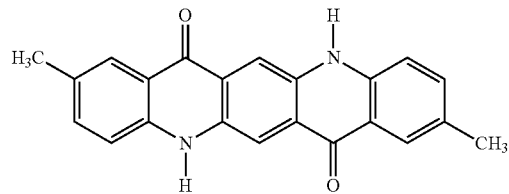

The Example and comparative magenta inks were tested to determine durability. This was accomplished by testing their respective resistances to highlighter smear for one, two and three passes (denoted 1×, 2×, and 3×, respectively in FIGS. 3A and 3B). The test for the resistance to highlighter smear was accomplished by printing the ink onto a medium using a pattern of parallel ⅛ inch, 100% density bars spaced ¼ inch apart, and after about 24 hours, passing a Faber Castell alkaline highlighter over the printed ink at a predetermined speed and pressure.

Figure 3A:
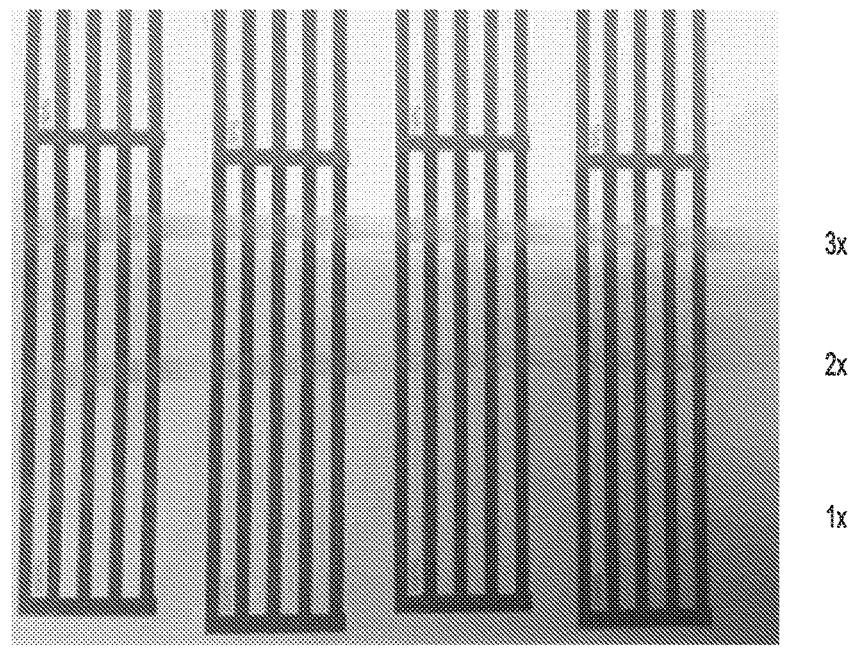
FIG. 3A is a black and white copy of a picture showing highlighter smear performance after one, two and three passes over a comparative magenta ink.
Figure 3B:
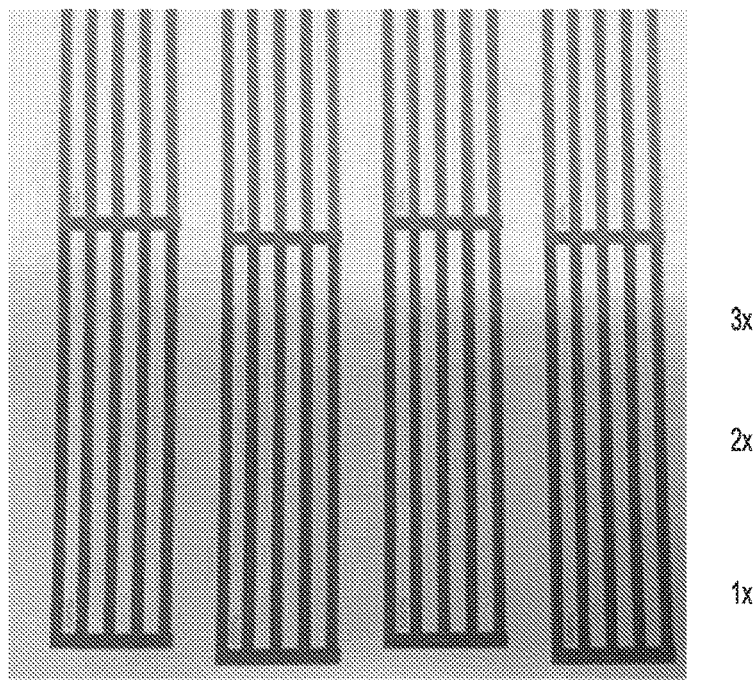
FIG. 3B is a black and white copy of a picture showing highlighter smear performance after one, two and three passes over an example of a magenta ink according to the present disclosure.

FIG. 3A is a black and white copy of a picture showing highlighter smear performance after one, two and three passes over the comparative magenta ink. FIG. 3B is a black and white copy of a picture showing highlighter smear performance after one, two and three passes over an example of a magenta ink according to the present disclosure.

As can be seen in FIG. 3B, the Example ink composition had almost no smearing at any of one, two or three passes. As can be seen in FIG. 3A, the comparative example had smearing after two passes, and more significant smearing after three passes. This shows that the Example magenta ink composition exhibits desirable durability (as well as improved durability with respect to the comparative magenta ink).

Example 4

TABLE 9

Cyan Ink composition in Vehicle A

| Pigment | PB-15:4 | 2.5 wt % |
|---|---|---|
| Co-solvent | 1-(2-hydroxyethyl)-2-pyrrolidone | 1.50 wt % |
| Humectant | DANTOCOL ® DHE | 8.00 wt % |
| Chelating agent | PDTA-H4 | 0.075 wt % |
| Non-ionic surfactant | SURFYNOL ® SE-F | 0.65 wt % |
| Biocide | PROXEL ® GXL | 0.18 wt % |

TABLE 9-continued

Cyan Ink composition in Vehicle A

| Biocide | KORDEK® MLX | 0.14 wt % |
|---|---|---|
| Phosphate-containing surfactant (anti-kogation agent) | CRODAFOS® N3 acid | 0.75 wt % |
| Inkjet pigment dispersant | PUD-51 | 1.25 wt % active |
| Deionized Water | | Balance |

An Example cyan ink composition was prepared using a PUD-51 hydrophilic pigment dispersant (from Table 1). The formulation of the example cyan ink composition (in Vehicle A) is shown in Table 9. A comparative cyan ink was also prepared according to Table 9, but substituting 0.86 wt % active of styrene acrylic resin (from a styrene acrylic resin dispersant, Joncryl® HPD 671), in place of the PUD-51 inkjet pigment dispersant.

The cyan pigment (Pigment Blue 15:4) has the following structure:

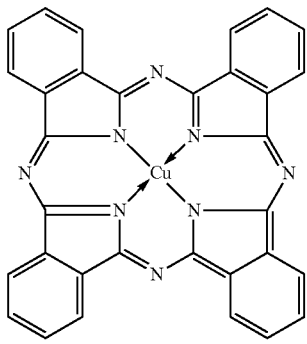

The Example and comparative cyan inks were tested to determine ink reliability/consistent print quality. To obtain consistent print quality over the life of the pen/cartridge, it is desirable to have a minimal change in drop velocity and a minimal change in drop weight. Each of the comparative cyan ink and Example cyan ink composition was filled into a thermal inkjet pen/cartridge (Hewlett Packard A3372 hybrid pens), and was continuously fired on a pen/cartridge life test apparatus for the life of the pen/cartridge. For this test, no media is used. Rather, the pen/cartridge life test apparatus exercises the pen/cartridge, and the ink drops are ejected into a spittoon. At certain intervals and at the end of the pen/cartridge life (over 400 million drops per nozzle, noted as "Final" in Table 10 below), the pen/cartridge drop velocity and drop weight were monitored. Table 10 illustrates the initial drop weight (DW) in nanograms and the final drop weight (DW) at the end of the pen/cartridge life in the ambient environment. Table 10 also illustrates the initial drop velocity (DV) in meters/second and the final drop weight (DV) at the end of the pen/cartridge life in the ambient environment.

The short term decap of the Example cyan ink composition and the comparative cyan ink was also tested by creating plots printed using a surrogate color printing tool. A one inch square block was printed to make sure all of the nozzles of the printer were firing properly, which was followed by a diagnostic pattern showing the health of each nozzle. The nozzles remained unfired for 1 second, and then the diagnostic pattern was printed again. The number of missing nozzles after the idle time was recorded, and the results are shown in Table 10.

TABLE 10

| Pigment | Dispersant | DW (ng) Initial | DW (ng) Final | DV (m/s) Initial | DV (m/s) Final | 1-sec Decap # missing |
|---|---|---|---|---|---|---|
| Cyan | PUD-51 | 6.4 | 6.3 | 12.4 | 11.4 | 0 |
| *Cyan | J671 | 7 | 2.8** | 13.4 | 9.0** | 0 |

*Comparative ink composition
**value at 150 million drops, comparative ink failed thereafter and did not finish test As can be seen in Table 10, the comparative cyan ink failed the drop weight and drop velocity tests, and reflected a significant decrease in both drop weight and drop velocity after 150 million drops. In contrast, the Example cyan ink had a minimal decrease in drop weight and drop velocity, showing good ink reliability.

It is to be understood that the ranges provided herein include the stated range and any value or sub-range within the stated range. For example, a range from about 0 wt % to about 60 wt % should be interpreted to include not only the explicitly recited limits of about 0 wt % to about 60 wt %, but also to include individual values, such as 6.5 wt %, 7.5 wt %, 48 wt %, etc., and sub-ranges, such as from about 6 wt % to about 8 wt %, from about 5 wt % to about 37 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent that the disclosed examples may be modified. Therefore, the foregoing description is to be considered non-limiting.

What is claimed is:
1. A hydrophilic pigment dispersant for an inkjet ink, the dispersant comprising:
    water; and
    a hydrophilic polyurethane having been formed from:
        a non-aromatic polyisocyanate present in an amount ranging from about 50 wt % to about 66 wt %;
        a polyol having a weight average molecular weight ranging from about 500 to about 5,000, the polyol being present in an amount ranging from about 0 wt % to about 8 wt %;
        an aromatic diol having a weight average molecular weight ranging from about 100 to about 1000, the aromatic diol being present in an amount ranging from about 9 wt % to about 24 wt %;
        an acid monomer having a hydroxyl functional group, an amino functional group, or both hydroxyl and amino functional groups, the acid monomer being present in an amount ranging from about 19 wt % to about 24 wt %; and
        a polyethyleneoxide compound having a hydroxyl functional group, an amino functional group, or both hydroxyl and amino functional groups, the polyeth- yleneoxide compound being present in an amount ranging from about 0.9 wt % to about 1.2 wt %;
and wherein each of the weight percents is based on a total amount of the hydrophilic polyurethane in the hydrophilic pigment dispersant.

2. The dispersant as defined in claim 1 wherein:
the non-aromatic polyisocyanate is an aliphatic or cycloaliphatic polyisocyanate selected from the group consisting of hexamethylene-1,6-diisocyanate (HDI); 1,12-dodecane diisocyanate (C12DI); 2,2,4-trimethyl-hexamethylene diisocyanate (TMDI); 2,4,4-trimethyl-hexamethylene diisocyanate (TMDI); 2-methyl-1,5-pentamethylene diisocyanate; isophorone diisocyanate (IPDI); 4,4'-diisocyanato dicyclohexylmethane (H12MDI); and combinations thereof;
the polyol is selected from the group consisting of polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters, halogenated polyethers, and combinations thereof;
the aromatic diol is selected from the group consisting of Bisphenol A, Bisphenol A ethoxylate, Bisphenol A (2,3-dihydroxypropyl) glycidyl ether, Bisphenol A bis (3-chloro-2-hydroxypropyl) ether, Bisphenol A bis(2,3-dihydroxypropyl) ether, Bisphenol A glycerolate (1glycerol/phenol) diacrylate, Bisphenol A propoxylate, 4,4'-(1-phenylethylidene)bisphenol, 4,4'-sulfonyldiphenol, 4,4'-dihydroxybiphenyl, 2,2'-biphenol, 4,4'-thiodiphenol, Bis[4-(2-hydroxyethoxy)phenyl] sulfone, 4,4'-sulfonylbis(2-methylphenol), and combinations thereof;
the acid monomer is selected from the group consisting of dimethylolpropionic acid (DMPA), dimethylol butanoic acid (DMBA), citric acid, tartaric acid, glycolic acid, lactic acid, malic acid, dihydroxymaleic acid, dihydroxytartaric acid, alanine, taurine, aminoethylaminopropylsulfonate (EPS), glycerol phosphate disodium dehydrate, and combinations thereof; and
the polyethyleneoxide compound is selected from the group consisting of the polyethyleneoxide compound having the amino functional group, methoxy polyethylene glycol, polyethyleneoxide diol, and combinations thereof.

3. The dispersant as defined in claim 1 wherein:
the polyol is present in an amount ranging from about 7 wt % to about 8 wt %; and
the aromatic diol is present in an amount ranging from about 18 wt % to about 19 wt %.

4. The dispersant as defined in claim 1 wherein the hydrophilic polyurethane is:
soluble in the water; or
dispersed in the water, and the dispersed hydrophilic polyurethane has an average particle size ranging from about 10 nm to about 200 nm.

5. A water soluble inkjet ink, comprising:
a dispersion of a plurality of colorant pigment particles;
a co-solvent;
a non-ionic surfactant;
an anti-kogation agent;
a humectant;
a chelating agent;
the hydrophilic pigment dispersant of claim 1, the dispersant surrounding the plurality of colorant pigment particles to form a plurality of dispersant-stabilized pigment particles; and
water.

6. The inkjet ink as defined in claim 5 wherein the plurality of dispersant-stabilized pigment particles has a change in a volume-weighted mean diameter that ranges from about −15% to about +2% after storage of the inkjet printable composition for two weeks at about 60° C., as compared with the volume-weighted mean diameter of the plurality of dispersant-stabilized pigment particles at ambient conditions after formation of the inkjet printable composition.

7. A water soluble inkjet ink, comprising:
a dispersion of a plurality of colorant pigment particles;
a co-solvent;
a non-ionic surfactant;
an anti-kogation agent;
a humectant;
a chelating agent;
a hydrophilic pigment dispersant surrounding the plurality of colorant pigment particles to form a plurality of dispersant-stabilized pigment particles, the hydrophilic pigment dispersant including:
water; and
a hydrophilic polyurethane having been formed from:
a non-aromatic polyisocyanate present in an amount ranging from about 25 wt % to about 70 wt %;
a polyol having a weight average molecular weight ranging from about 500 to about 5,000, the polyol being present in an amount ranging from about 0 wt % to about 60 wt %;
an aromatic diol having a weight average molecular weight ranging from about 100 to about 1000, the aromatic diol being present in an amount ranging from about 0 wt % to about 30 wt %;
an acid monomer having a hydroxyl functional group, an amino functional group, or both hydroxyl and amino functional groups, the acid monomer being present in an amount ranging from about 5 wt % to about 25 wt %; and
a polyethyleneoxide compound having a hydroxyl functional group, an amino functional group, or both hydroxyl and amino functional groups, the polyethyleneoxide compound being present in an amount ranging from about 0 wt % to about 5 wt %;
wherein at least one of the polyol or the aromatic diol is present;
and wherein each of the hydrophilic polyurethane weight percents is based on a total amount of the hydrophilic polyurethane in the hydrophilic pigment dispersant;
an aqueous dispersion of polymer particles having a particle size ranging from about 185 nm to about 215 nm and having a polydispersity index (PDI) ranging from about 1.1 to about 1.2;
a non-ionic fluorosurfactant;
a water soluble acrylic acid polymer dispersant;
a polyethylene wax emulsion; and
water;
wherein the plurality of dispersant-stabilized pigment particles has a change in a volume-weighted mean diameter that ranges from about −10% to about −4% after storage of the inkjet printable composition for two weeks at about 60° C., as compared with the volume-weighted mean diameter of the plurality of pigment particles at ambient conditions after formation of the inkjet printable composition.

8. The inkjet ink as defined in claim 5 wherein:

the colorant pigment particle dispersion is present in an amount ranging from about 2.5 wt % to about 5 wt % of a total wt % of the ink;

the co-solvent is present in an amount ranging from about 0.5 wt % to about 10 wt % of a total wt % of the ink;

the non-ionic surfactant is present in an amount ranging from about 0.5 wt % to about 0.65 wt % of a total wt % of the ink;

the anti-kogation agent is present in an amount ranging from about 0.2 wt % to about 0.75 wt % of a total wt% of the ink;

the humectant is present in an amount ranging from about 4 wt % to about 8 wt % of a total wt% of the ink;

the chelating agent is present in an amount ranging from about 0.002 wt % to about 0.075 wt % of a total wt % of the ink;

the hydrophilic polyurethane is present in an amount ranging from about 1.5 wt % active to about 2.1 wt % active in the inkjet ink; and a balance of the water.

9. The inkjet ink as defined in claim 7 wherein:

the colorant pigment particle dispersion is present in an amount ranging from about 2.6 wt % to about 4 wt % of a total wt % of the ink;

the co-solvent is present in an amount ranging from about 7 wt % to about 13 wt % of a total wt % of the ink;

the non-ionic surfactant is present in an amount ranging from about 0.5 wt % to about 1 wt % of a total wt % of the ink;

the anti-kogation agent is present in an amount ranging from about 0.1 wt % to about 0.2 wt % of a total wt % of the ink;

the humectant is present in an amount ranging from about 3 wt% to about 9 wt % of a total wt % of the ink;

the chelating agent is present in an amount ranging from about 0.02 wt % to about 0.04 wt % of a total wt % of the ink;

the aqueous dispersion of polymer particles is present in an amount ranging from about 4 wt % to about 7 wt % of a total wt % of the ink;

the non-ionic fluorosurfactant is present in an amount ranging from about 0.4 wt % to about 0.65 wt % of a total wt % of the ink;

the water soluble acrylic acid polymer dispersant is present in an amount of about 0.0075 wt % of a total wt % of the ink;

the polyethylene wax emulsion is present in an amount ranging from about 0.4 wt % to about 0.8 wt % of a total wt% of the ink;

the hydrophilic polyurethane is present in an amount ranging from about 1.0 wt % active to about 1.34 wt % active in the inkjet ink; and a balance of the water.

10. The inkjet ink as defined in claim 5 wherein a ratio (P/D) of a weight percent of the plurality of colorant pigment particles in the colorant pigment particle dispersion to a weight percent active of the hydrophilic polyurethane in the hydrophilic inkjet pigment dispersant ranges from about 2.0 to about 2.6.

11. The inkjet ink as defined in claim 5 wherein the plurality of colorant pigment particles has a polarity ranging from about 0.39 to about 0.47.

\* \* \* \* \*